United States Patent Office 2,753,324
Patented July 3, 1956

2,753,324

COMPOSITION OF MATTER

Donald E. Lintala, Akron, and Paul M. Lindstedt, Cuyahoga Falls, Ohio, assignors, by mesne assignments, to The Goodyear Tire & Rubber Company, a corporation of Ohio No Drawing. Application February 15, 1951,
Serial No. 211,176

1 Claim. (Cl. 260—79.5)

This invention relates to new compositions of matter. More particularly it relates to new compositions of matter which are useful as compounding ingredients for elastomeric compositions, to methods for treating and vulcanizing elastomeric products therewith, and to the elastomeric products obtained thereby.

The terms "rubber" and "elastomer" as used in this specification and in the appended claims are definitive of rubber-like materials of the class including natural rubber, synthetic rubbers such as the rubbery copolymers of butadiene and styrene, butadiene and acrylonitrile, isobutylene and butadiene, polychloroprene, and other similar synthetic elastomers.

A problem of long standing in the rubber industry is that caused by the tendency of certain powdered compounding ingredients, particularly rubber accelerators, to be carried into the air surrounding production operations because of the dust-like nature of the ingredients used. This "flying" of the powdered particles causes a loss of material, contamination, and health hazards resulting from the irritation to the mucous membranes in the mouths and nasal passages of the workmen who are exposed to the the contaminated air. Various efforts have been made to solve this problem, such as by treating the powdered particles with various materials or converting the finely divided powders into an agglomerated mass.

If the solution to the problem is to be the formation of a pelletized or agglomerated material, the pelletized material must be capable of being disintegrated into its original discrete particles in order to become thoroughly and uniformly dispersed throughout the rubber by the normal shearing forces developed during the rubber mixing processes. In addition to the obvious requirement of dispersibility, the pelletized material must possess a certain amount of structural strength in order to retain its pelletized form while being subjected to shipping and handling operations from the producer to the consumer. It has been known to coat powdered materials with various substances in order to bind together the discrete particles of powder into agglomerates. However, in order to obtain the proper structural strength in the agglomerate and at the same time the necessary degree of dispersibility of the agglomerated particles in the rubber, it has often been necessary to use rather large amounts of the treating agent. This excessive dilution of the pure powder is objectionable to the consumer who prefers to use a material as nearly chemically pure as possible. This is especially true where the powder is an organic accelerator.

It is therefore an object of this invention to provide for the treatment of powdered materials with a minimum amount of dilution to produce pelletized or agglomerated materials which will not "dust" or "fly," which have sufficient structural strength to retain their pelletized form during shipping and handling operations, and yet which may be readily and uniformly dispersed into and through the rubber in essentially their original discrete particle size during the mixing of the rubber and the agglomerate. Another object is to provide a treatment for powdered compounding ingredients of such a nature that the amounts of treating material used need not be substantially altered when different powdered materials are treated. Other objects and purposes will appear as the description proceeds.

According to the practice of this invention, the powdered material which is to be treated is mixed with controlled amounts of two additional ingredients. The first ingredient functions as a "binder" for the individual powdered particles and minimizes the amount of treating agent required for a satisfactory product. The second ingredient functions as a "wetting agent" and serves the dual purpose of imparting desired processing properties to the powdered material as it is being pelletized and of distributing the "binder" upon the surfaces of the powdered particles. The powdered material, the binder, and the wetting agent are mixed together with a controlled amount of water to yield a paste of such a physical consistency that it can be shaped in any kind of pellet-forming apparatus such as a molding press or an extrusion die. The water present in the formed pellet is then removed by any conventional drying means to yield a substantially dry pellet.

This invention is applicable to the treatment and pelletizing of any dry powdered material. Among the materials to which the invention is particularly applicable in the rubber art are the powdered organic accelerators and antioxidants. Illustrative of the rubber compounding ingredients to which this invention pertains are tetramethyl thiuram disulfide, tetramethyl thiuram monosulfide, tetraethyl thiuram disulfide, mercaptobenzothiazol, 2,2' benzothiazyl disulfide, diphenyl guanidine, zinc dimethyl dithiocarbamate, zinc dibutyl dithiocarbamate, copper diethyl dithiocarbamate, lead dimethyl dithiocarbamate, selenium diethyl dithiocarbamate, selenium dimethyl dithiocarbamate, copper mercaptobenzothiazole, zinc mercaptobenzothiazole, phenyl beta naphthylamine, and diphenyl para phenylene diamine. A variety of other similar materials may also be treated with comparable beneficial results.

The "binder" which is used in the practice of this invention is a quaternary ammonium salt or mixtures of such salts. More particularly, the binders may be termed tetra-aliphatic ammonium chlorides of the following general formula

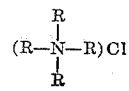

in which at least one R represents a long chain hydrocarbon radical of the structure found in various commercially available fatty acids and containing from 8 to 22 carbon atoms and the balance of the R's are relatively short chain hydrocarbon radicals of which it is preferred at least 2 be present. The short chain hydrocarbon radicals contain from 1 to 5 carbon atoms. The R's representing the long chain hydrocarbon radical may be octyl, nonyl, decyl, hendecyl, dodecyl, tridecyl, tetradecyl, pentadecyl, hexadecyl, heptadecyl, octadecyl, nonadecyl, eicosyl, heneicosyl, and docosyl, while the R's representing the relatively short-chain hydrocarbon radicals may be methyl, ethyl, propyl, isopropyl, butyl and pentyl. For example, there may be used di-tetradecyl dimethyl ammonium chloride, di-tetradecyl diethyl ammonium chloride, di-hexadecyl dimethyl ammonium chloride, di-hexadecyl diethyl ammonium chloride, di-dodecyl dimethyl ammonium chloride, and dioctadecyl dimethyl ammonium chloride.

A preferred form of the binders may be termed alkyl trimethyl ammonium chlorides of the following general formula

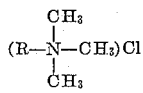

in which R represents a long chain hydrocarbon radical of the structure found in various commercially available fatty acids and containing from 8 to 22 carbon atoms. There may also be employed compounds responding to the foregoing formula but in which one or more of the methyl groups has been replaced by other alkyl radicals, such as ethyl, propyl, isopropyl, butyl or pentyl, but the trimethyl compounds are preferred. Specific examples of these binders are octyl trimethyl ammonium chloride, decyl trimethyl ammonium chloride, dodecyl trimethyl ammonium chloride, tetradecyl trimethyl ammonium chloride, hexadecyl trimethyl ammonium chloride, octadecyl trimethyl ammonium chloride, octadecenyl trimethyl ammonium chloride, and octadecadienyl trimethyl ammonium chloride. In the practice of this invention one or more of these ammonium salts may be used. These materials are currently available commercially under the trade name "Arquads" from Armour and Company—Chemical Division, Chicago, Illinois. As marketed commercially the "Arquads" are mixtures of the quaternary ammonium salts containing about 50% solvent by weight. The solvent may be water or an organic solvent such as isopropyl alcohol or methyl alcohol. A particularly useful form of the binder is known as Arquad 18 which has the following approximate composition by weight:

| | Percent |
|---|---|
| Hexadecyl trimethyl ammonium chloride | 3.00 |
| Octadecyl trimethyl ammonium chloride | 46.50 |
| Octadecenyl trimethyl ammonium chloride | 0.50 |
| Solvent | 50. |

Satisfactory results have been obtained by the use of as little as 0.05% of the ammonium salts by weight of the powdered material to be treated. The best results have been obtained using from 0.25% to 2.00% by weight of the powdered material. Amounts in excess of 2% up to about 10% may be used although proportions of the quaternary ammonium salts in excess of 2% by weight of the powdered material may not effect any additional improvement in the desired properties of the agglomerate. If the quaternary ammonium salt is used in an amount in excess of 2% by weight of the powder, it is sometimes desirable to add a softening agent such as an oil in order to produce a pellet which has good dispersion properties.

The "wetting agent" used in conjunction with the "binder" for treating the powdered material may be any wetting agent which is compatible with rubber. Examples of suitable wetting agents are those containing the alkali metal, ammonium, or amine salts of saturated or unsaturated fatty acids having from 12 to 24 carbon atoms in the molecule. Specific examples are the salts of oleic, stearic, ricinoleic, linoleic, and lauric acids, sodium stearate, ammonium stearate, ammonium oleate, triethanol amine oleate, and mixtures of such compounds as usually occur in commercial soaps. A particularly useful wetting agent is the ammonium stearate soap, since, during the drying operation after the pellets have been formed, the temperature is usually high enough to decompose the soap to evolve ammonia gas, leaving a residue of stearic acid which is commonly used in rubber formulations. It has been found possible to add from 1% to 10% of the wetting agent by weight based upon the weight of the powdered material, i. e., the accelerator or antioxidant. For best results and for minimizing the amount of diluent in the final product, a preferred range is from 2% to 4% of the wetting agent by weight of the powder.

It has been found that by using these relatively small amounts of the quaternary ammonium salts as binders and of the wetting agents as dispersion aids, an agglomerated form of powdered material can be made which has all the desired properties of a compounding ingredient for rubber. The agglomerate can be prepared with minimum dilution, and has adequate structural strength and excellent dispersion properties. Use of the wetting agent alone produces an agglomerate which is deficient in structural strength and which pulverizes too readily, while use of the binder alone produces an agglomerate which does not possess the best dispersion properties. It is by combining the two in treating the powder that best results are obtained, and this is the preferred procedure.

Further details of the practice of this invention are set forth in the following examples.

*Example 1*

A solution was prepared containing 42 pounds of water at approximately 140° F., 2 pounds of stearic acid, 0.7 pound of a 28% ammonia solution in water, and 2 pounds of Arquad 18. This solution was added to 100 pounds of 2,2'-benzothiazyl disulfide. The materials were thoroughly mixed to form a uniform dough and then processed through an extruding apparatus, producing long filaments or rods.

*Example 2*

A solution was prepared containing 29 pounds of water at approximately 140° F., 2 pounds of stearic acid, 0.7 pound of a 28% ammonia solution in water, and 2 pounds of Arquad 18. This solution was added to 100 pounds of tetramethyl thiuram disulfide. The materials were thoroughly mixed to form a uniform dough and then processed through an extruding apparatus, producing long filaments or rods.

*Example 3*

A solution was prepared containing 42 pounds of water at approximately 140° F., 2 pounds of stearic acid, 0.7 pound of a 28% ammonia solution in water, and 2 pounds of Arquad 18. This solution was added to 100 pounds of zinc dimethyl dithiocarbamate. The materials were thoroughly mixed to form a uniform dough and then processed through an extruding apparatus, producing long filaments or rods.

The long filaments or rods prepared according to Examples 1, 2 and 3 were subsequently air-dried to a water content of less than 0.5% by weight. The drying operation and necessary handling caused the long filaments to break up into short, stable, rod-like shapes.

Each of the rod-formed accelerators prepared according to Examples 1, 2 and 3 was compounded into a rubber and was found to possess excellent dispersion properties, the organic compound being uniformly dispersed throughout the mixture.

The amount of water and the amount of mixing required to produce a dough of the proper consistency to process into pelletized form will, of course, vary depending upon the particular powdered material being treated. In general, prolonged mixing is to be avoided since after prolonged mixing a "fluid" mixture results which is difficult to process satisfactorily. For the same reason excessive amounts of water should be avoided.

While certain representative embodiments and details have been shown for the purpose of illustrating the invention, it will be apparent to those skilled in this art that various changes and modifications may be made therein without departing from the spirit or scope of the invention.

We claim:

As a new composition of matter, a pelletized compounding ingredient for rubber comprising 100 parts by weight of 2,2'-benzothiazyl disulfide, from 0.25 to 2.00 parts by weight of a mixture of alkyl trimethyl ammonium chlorides of the following approximate composition by weight:

| | Percent |
|---|---|
| Hexadecyl trimethyl ammonium chloride | 6 |
| Octadecyl trimethyl ammonium chloride | 93 |
| Octadecenyl trimethyl amonium chloride | 1 | and from 2 to 4 parts by weight of ammonium stearate.

References Cited in the file of this patent
UNITED STATES PATENTS

| 2,296,066 | Sloan | Sept. 15, 1942 |
| 2,528,186 | Stanley | Oct. 31, 1950 |
| 2,605,255 | Nadler | July 29, 1952 |
| 2,640,008 | Glenn et al. | May 26, 1953 |